United States Patent
Tabirian et al.

(10) Patent No.: US 10,114,239 B2
(45) Date of Patent: Oct. 30, 2018

(54) WAVEPLATE LENSES AND METHODS FOR THEIR FABRICATION

(71) Applicants: Beam Engineering for Advanced Measurements Co., Orlando, FL (US); The United States of America as Represented by the Secretary of the Army, Washington, DC (US)

(72) Inventors: Nelson Tabirian, Winter Park, FL (US); Svetlana Serak, Oviedo, FL (US); Diane Steeves, Franklin, MA (US); Brian Kimball, Shrewsbury, MA (US)

(73) Assignees: Beam Engineering for Advanced Measurements Co., Orlando, FL (US); The United States of America as Represented by the Secretary of the Army, Washington, DC (US)

( * ) Notice: Subject to any disclaimer, the term of this patent is extended or adjusted under 35 U.S.C. 154(b) by 440 days.

(21) Appl. No.: 14/214,375

(22) Filed: Mar. 14, 2014

(65) Prior Publication Data

US 2017/0045760 A1    Feb. 16, 2017
US 2018/0024387 A9    Jan. 25, 2018

Related U.S. Application Data

(63) Continuation-in-part of application No. 13/860,934, filed on Apr. 11, 2013, now abandoned, which is a
(Continued)

(51) Int. Cl.
*G02F 1/01*    (2006.01)
*G02F 1/1337*    (2006.01)
(Continued)

(52) U.S. Cl.
CPC ...... *G02F 1/0136* (2013.01); *G02F 1/133365* (2013.01); *G02F 1/133788* (2013.01); *G02F 1/134309* (2013.01)

(58) Field of Classification Search
CPC .................................................. G02F 1/0136
(Continued)

(56) References Cited

U.S. PATENT DOCUMENTS 2,435,616 A    2/1948    Wittum
3,721,486 A    3/1973    Bramley
(Continued)

FOREIGN PATENT DOCUMENTS

EP    1970734    9/2008
EP    2088456    12/2009
(Continued)

OTHER PUBLICATIONS

Fan et al; Axially symmetric polarization converter made of patterned liuid crystal quarter wave plate; Optics Express; vol. 20, No. 21; pp. 23036-23043; published Sep. 24, 2012.*
(Continued)

*Primary Examiner* — Elizabeth A Burkhart
(74) *Attorney, Agent, or Firm* — Brian S. Steinberger; Law Offices of Brian S. Steinberger, P.A.

(57) ABSTRACT

The invention provides for lenses fabricated as planar thin film coatings with continuous structure. The lensing action is due to optical axis orientation modulation in the plane of the lens. The lenses of the current invention are fabricated using photoalignment of a liquid crystal polymer wherein the polarization pattern of radiation used for photoalignment is obtained by propagating the light through an optical system comprising a shape-variant nonlinear spatial light polarization modulators.

8 Claims, 12 Drawing Sheets

Related U.S. Application Data continuation of application No. 12/662,525, filed on Apr. 21, 2010, now abandoned.

(60) Provisional application No. 61/801,251, filed on Mar. 15, 2013.

(51) Int. Cl.
    *G02F 1/1333* (2006.01)
    *G02F 1/1343* (2006.01)

(58) Field of Classification Search
    USPC ........ 359/484, 489.03, 489.06; 427/160–169
    See application file for complete search history.

(56) References Cited

U.S. PATENT DOCUMENTS

| | | | |
|---|---|---|---|
| 3,897,136 A | 7/1975 | Bryngdahl | |
| 4,301,023 A | 11/1981 | Schuberth | |
| 4,956,141 A | 9/1990 | Allen | |
| 4,983,332 A | 1/1991 | Hahn | |
| 5,032,009 A | 7/1991 | Gibbons | |
| 5,047,847 A | 9/1991 | Toda | |
| 5,142,411 A | 8/1992 | Fiala | |
| 5,325,218 A | 6/1994 | Willett | |
| 5,610,325 A | 4/1997 | Yoshida | |
| 5,712,721 A | 1/1998 | Large | |
| 5,895,422 A | 4/1999 | Hauber | |
| 5,903,330 A | 5/1999 | Funschilling | |
| 5,989,758 A | 11/1999 | Komatsu | |
| 6,025,899 A * | 2/2000 | Fukunaga | G02F 1/133514 349/106 |
| 6,091,471 A | 7/2000 | Kim | |
| 6,139,147 A | 10/2000 | Zhang | |
| 6,219,185 B1 | 4/2001 | Hyde | |
| 6,551,531 B1 | 4/2003 | Ford | |
| 6,792,028 B2 | 9/2004 | Cook | |
| 7,094,304 B2 | 8/2006 | Nystrom | |
| 7,095,772 B1 | 8/2006 | Delfyett et al. | |
| 7,196,758 B2 | 3/2007 | Crawford | |
| 7,319,566 B2 | 1/2008 | Prince | |
| 7,324,286 B1 | 1/2008 | Glebov | |
| 7,450,213 B2 | 11/2008 | Kim et al. | |
| 7,764,426 B2 | 7/2010 | Lipson | |
| 8,077,388 B2 | 12/2011 | Gerton | |
| 8,264,623 B2 | 9/2012 | Marrucci | |
| 8,520,170 B2 | 8/2013 | Escuti | |
| 8,982,313 B2 | 3/2015 | Escuti et al. | |
| 9,658,512 B2 | 5/2017 | Tabirian et al. | |
| 9,715,048 B2 | 7/2017 | Tabirian et al. | |
| 9,753,193 B2 | 9/2017 | Tabirian et al. | |
| 9,983,479 B2 | 5/2018 | Tabirian et al. | |
| 10,031,424 B2 | 7/2018 | Tabirian et al. | |
| 10,036,886 B2 | 7/2018 | Tabirian et al. | |
| 2001/0002895 A1 | 6/2001 | Kawano | |
| 2001/0018612 A1 | 8/2001 | Carson | |
| 2001/0030720 A1 | 10/2001 | Ichihashi | |
| 2002/0027624 A1 | 3/2002 | Seiberle | |
| 2002/0097361 A1 | 7/2002 | Ham | |
| 2002/0167639 A1 | 11/2002 | Coates | |
| 2003/0072896 A1 | 4/2003 | Kwok | |
| 2003/0137620 A1 | 7/2003 | Wang | |
| 2003/0152712 A1 | 8/2003 | Motomura | |
| 2004/0105059 A1 | 6/2004 | Ohyama | |
| 2005/0030457 A1 | 2/2005 | Kuan et al. | |
| 2005/0110942 A1 | 5/2005 | Ide | |
| 2006/0008649 A1 | 1/2006 | Shinichiro | |
| 2006/0055883 A1 | 3/2006 | Morris | |
| 2006/0221449 A1 | 10/2006 | Gleboz et al. | |
| 2006/0222783 A1 | 10/2006 | Hayashi | |
| 2007/0032866 A1 | 2/2007 | Portney | |
| 2007/0115551 A1* | 5/2007 | Spilman | G02B 27/286 359/489.07 |
| 2007/0122573 A1 | 5/2007 | Yasuike | |
| 2007/0132930 A1 | 6/2007 | Ryu et al. | |
| 2007/0247586 A1 | 10/2007 | Tabirian | |
| 2007/0258677 A1 | 11/2007 | Chigrinov | |
| 2008/0226844 A1 | 9/2008 | Shemo | |
| 2008/0278675 A1 | 11/2008 | Escuti | |
| 2009/0002588 A1 | 1/2009 | Lee et al. | |
| 2009/0052838 A1 | 2/2009 | McDowall | |
| 2009/0073331 A1 | 3/2009 | Shi | |
| 2009/0122402 A1 | 5/2009 | Shemo | |
| 2009/0141216 A1* | 6/2009 | Marrucci | G02F 1/0305 349/98 |
| 2009/0256977 A1 | 10/2009 | Haddock | |
| 2009/0257106 A1 | 10/2009 | Tan | |
| 2009/0264707 A1 | 10/2009 | Hendricks | |
| 2010/0066929 A1 | 3/2010 | Shemo | |
| 2011/0075073 A1 | 3/2011 | Oiwa | |
| 2011/0085117 A1 | 4/2011 | Moon et al. | |
| 2011/0097557 A1 | 4/2011 | May | |
| 2011/0109874 A1 | 5/2011 | Piers | |
| 2011/0135850 A1 | 6/2011 | Saha | |
| 2011/0188120 A1 | 8/2011 | Tabirian | |
| 2011/0234944 A1 | 9/2011 | Powers | |
| 2011/0262844 A1* | 10/2011 | Tabirian | G02B 5/3083 430/2 |
| 2012/0140167 A1 | 6/2012 | Blum | |
| 2012/0162433 A1 | 6/2012 | Fuentes Gonzalez | |
| 2012/0188467 A1 | 7/2012 | Escuti | |
| 2013/0057814 A1 | 3/2013 | Prushinskiy et al. | |
| 2014/0055740 A1 | 2/2014 | Spaulding | |
| 2014/0211145 A1 | 7/2014 | Tabirian | |
| 2014/0252666 A1 | 9/2014 | Tabirian | |
| 2015/0049487 A1 | 2/2015 | Connor | |
| 2015/0276997 A1 | 10/2015 | Tabirian et al. | |
| 2016/0023993 A1 | 1/2016 | Tabirian | |
| 2016/0047955 A1 | 2/2016 | Tabirian | |
| 2016/0047956 A1 | 2/2016 | Tabirian | |
| 2016/0363783 A1 | 12/2016 | Blum | |
| 2017/0010397 A1 | 1/2017 | Tabirian | |

FOREIGN PATENT DOCUMENTS

| | | |
|---|---|---|
| GB | 2209751 | 5/1989 |
| JP | 2001142033 | 5/2001 |
| JP | 2004226752 | 8/2004 |
| WO | 2008130555 | 10/2008 |
| WO | 2008130559 | 10/2008 |

OTHER PUBLICATIONS

Pagliusi et al. Surface-induced photorefractivity in twistable nematics: toward the all-optical control of gain, Opt. Expr. vol. 16, Oct. 2008, 9 pages.

M. Honma, T. Nose, Polarization-independent liquid crystal grating fabricated by microrubbing process, Jpn. J. Appl. Phys., Part 1, vol. 42, 2003, 3 pages.

Anderson, G., et al., Broadband Antihole Photon Sieve Telescope, Applied Optics, vol. 16, No. 18., Jun. 2007, 3 pages.

Early, J. et al., Twenty Meter Space Telescope Based on Diffractive Fresnel Lens, SPIE, U.S. Department of Energy, Lawrence Livermore National Laboratory, Jun. 2003, 11 pages.

Martinez-Cuenca, et al., Reconfigurable Shack-Hartmann Sensor Without Moving Elements,Optical Society of America, vol. 35, No. 9, May 2010, 3 pages.

Serak, S., et al., High-efficiency 1.5 mm Thick Optical Axis Grating and its Use for Laser Beam Combining, Optical Society of America, vol. 32, No., Jan. 2007, 4 pages.

Ono et al., Effects of phase shift between two photoalignment substances on diffration properties in liquid crystalline grating cells, Appl. Opt. vol. 48, Jan. 2009, 7 pgs.

Naydenova et al., "Diffraction form polarization holographic gratings with surface relief in side chain azobenzene polyesters" J. Opt. Soc. Am. B, vol. 15, (1998), 14 pages.

Oh et al., Achromatic polarization gratings as highly efficent thin-film polarizing beamsplitters for broadband light Proc. SPIE vol. 6682, (2007), 4 pages.

Nersisyan, S., et al., Polarization insensitive imaging through polarization gratins, Optics Express, vol. 17, No. 3, Feb. 2, 2009, 14 pages.

(56) References Cited

OTHER PUBLICATIONS

Oise, Optics in the Southeast, Technical Conference and Tabletop Exhibit, Optical Society of America, Orlando, FL., Nov. 12-13, 2003, 9 pages.
Dierking, Polymer Network-Stabilized Liquid Crystals, Advanced Materials, vol. 12, No. 3, 2000, 15 pages.
Tabirian, N., et al., U.S. Appl. No. 61/757,259, filed Jan. 28, 2013, 29 pages.
U.S. Appl. No. 14/193,027, filed Feb. 2014, Tabirian et al.
U.S. Appl. No. 61/757,259, filed Jan. 2013, Tabirian et al.
Tabiryan, et al., The Promise of Diffractive Waveplates, OPN Optics and Photonics News, Mar. 2010, 6 pages.
Tabiryan, et al., Fabricating Vector Vortex Waveplates for Coronagraphy, 2012, 12 pages.
Tabirian, et al., PCT Application No. PCT/US15/26186 filed Apr. 16, 2015, Notification of Transmittal of the International Search Report and the Written Opinion of the International Searching Authority dated Jul. 14, 2015, 17 pages.
Beam Engineering for Advced Measurements Co., et al., PCT Application No. PCT/US2016/038666 filed Jun. 22, 2016, Notification of Transmittal of the International Search Report and the Written Opinion of the International Searching Authority , or the Declaration dated Oct. 10, 2016, 16 pages.
Nersisyan, et al., Study of azo dye surface command photoalignment material for photonics applications, Applied Optics, vol. 49, No. 10, Apr. 1, 2010, 8 pages.
Nersisyan, et al., Characterization of optically imprinted polarization gratings, Applied Optics, vol. 48, No. 21, Jul. 20, 2009, 6 pages.
Niersisyan, et al., Fabrication of Liquid Crystal Polymer Axial Waveplates for UV-IR Wavelengths, Optics Express, vol. 17, No. 14, Jul. 2009, 9 pages.
Nersisyan, et al., Optical Axis Gratings in Liquid Crystals and Their Use for Polarization Insensitive Optical Switching, Journal of Nonlinear Optical Physics & Materials, vol. 18, No. 1, 2009, 47 pages.
Niersisyan, et al., Polarization insensitive imaging through polarization gratings, Optics Express, vol. 17, No. 3, Feb. 2, 2009, 14 pages.
Sarkissian, et al., Longitudinally modulated nematic bandgap structure, Optical Society of America, vol. 23, No. 8, Aug. 2008, 6 pages.
Sarkissian, et al., Polarization-universal bandgap in periodically twisted nematics, Optics Letters, vol. 31, No. 11, Jun. 1, 2006, abstract, 4 pages.
Sarkissian, et al., Periodically Aligned Liquid Crystal: Potential Application for Projection Displays, Mol. Cryst. Liq. Cryst., vol. 451, 2006, 19 pages.
Sarkissian, et al., Potential application of Periodically Aligned Liquid Crystal cell for projection displays, JThE12, 2005, 3 pages.
Sarkissian, et al., Polarization-Controlled Switching Between Diffraction Orders in Transverse-Periodically Aligned Nematic Liquid Crystals, Optics Letters, Aug. 2006, abstract, 4 pages.
Schadt, et al., Photo-Induced Alignment and Patterning of Hybrid Liquid Crystalline Polymer Films on Single Substrates, Jpn. J. Appl. Phys., vol. 34, Part 2, No. 6B, Jun. 15, 1995, 4 pages.
Schadt , et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.
Schadt, et al., Optical patterning of multi-domain liquid-crystal displays with wide viewing angles, Nature, vol. 381, May 16, 1996, 4 pages.
Escuti, et al., A Polarization-Independent Liquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al, Simplified Spectropolarimetry Using Reactive Mesogen Polarization Gratings, Imaging Spectrometry XI, Proc. of SPIE, vol. 6302, 2006, 11 pages.

Gibbons, et al., Surface-mediated alignment of nematic liquid crystals with polarized laser light, Nature, vol. 351, May 2, 1991, 1 page.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett., 65, Nov. 14, 1994, 3 pages.
University of Central Florida, School of Optics CREOL PPCE, Optics in the Southeast, Technical Conference and Tabletop Exhibit, Nov. 12-13, 2003, 9 pages.
Ichimura, et al., Surface assisted photoalignment control of lyotropic liquid crystals, Part 1, Characterization and photoalignment of aqueous solutions of a water soluble dyes as lyotropic liquid crystals, J. Materials. Chem., vol. 12, 2002, abstract, 2 pages.
Ichimura, et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, 1988, 3 pages.
Zel'Dovich, et al., Devices for displaying visual information, Disclosure, School of Optics/CREOL, University of Central Florida, Jul. 2000, 10 pages.
Provenzano, et al., Highly efficient liquid crystal based diffraction grating induced by polarization holograms at the aligning surfaces, Applied Physics Letter 89, 2006, 4 pages.
Titus, et al., Efficient polarization-independent, re ective liquid crystal phase grating, Applied Physics Letter 71, Oct. 20, 1197, 3 pages.
Chen, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Liquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.
Fuh, et al., Dynamic studies of holographic gratings in dye-doped liquid-crystal films, Optics Letter, vol. 26, No. 22, Nov. 15, 2001, 3 pages.
Yu, et al., Polarization Grating of Photoaligned Liquid Crystals with Oppositely Twisted Domain Structures, Molecular Crystals Liquid Crystals, vol. 433, 2005, 7 pages.
Crawford, et al., Liquid-crystal diffraction gratings using polarization holography alignment techniques, Journal of Applied Physics 98, 2005, 10 pages.
Seiberle, et al., 38.1 Invited Paper: Photo-Aligned Anisotropic Optical Thin Films, SID 03 Digest, 2003, 4 pages.
Wen, et al., Nematic liquid-crystal polarization gratings by modification of surface alignment, Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
McEldowney, et al., Creating vortex retarders using photoaligned LC polymers, Optics Letter, vol. 33, No. 2, Jan. 15, 2008, 3 pages.
Marrucci, et al., Pancharatnam-Berry phase optical elements for wave front shaping in the visible domain, Appl. Phys. Lett. 88, 2006, 3 pages.
Stalder, et al., Lineraly polarized light with axial symmetry generated by liquid-crystal polarization converters, Optics Letters vol. 21, No, 1996, 3 pages.
Kakichashvili, et al., Method for phase polarization recording of holograms, Sov. J. Quantum. Electron, vol. 4, 6, Dec. 1974, 5 pages.
Todorov, et al., High-Sensitivity Material With Reversible Photo-Induced Anisotropy, Optics Communications, vol. 47, No. 2, Aug. 15, 1983, 4 pages.
Attia, et al., Anisotropic Gratings Recorded From Two Circularly Polarized Coherent Waves, Optics Communications, vol. 47, No. 2, Aug. 15, 1983, 6 pages.
Cipparrone, et al., Permanent polarization gratings in photosensitive langmuir blodget films, Applied Physics Letter, vol. 77, No. 14, Oct. 2, 2000, 4 pages.

(56) References Cited

OTHER PUBLICATIONS

Nikolova, et al., Diffraction Efficiency and Selectivity of Polarization Holographic Recording, Optica Acta: International Journal of Optics, vol. 31, No. 5, 1984, 11 pages.
Lee et al., "Generation of pretilt angles of liquid crystals on cinnamte-based photoalignment . . . ", Opt., Expr., vol. 17 (26) (Dec. 2009), abstract, 4 pages.
Yaroshchuk et al. "Azodyes as photoalignment agents for polymerizable liquid crystals", IDW'06 Digest vol. 1-3, 2006, 4 pages.
Chigrinov et al. "Anchoring properties of photoaligned azo-dye materials" Phys. Rev., E vol. 68, (Dec. 2003), 5 pages.
Pepper, M. et al, Nonlinear Optical Phase Conjugation, IEEE, Sep. 1991, pp. 21-34, 14 pages.
Tabirian, N., U.S. Appl. No. 14/194,808 filed Mar. 2, 2014, Office Action Summary dated Feb. 9, 2018, 10 pages.
Tabirian, N., U.S. Appl. No. 14/324,126, filed Jul. 4, 2014, Office Action Summary dated Feb. 8, 2018, 13 pages.
Tabirian, et al., Utility U.S. Appl. No. 14/688,197 filed Apr. 16, 2016, Office Action Summary dated Aug. 6, 2018, 19 pages.
Tabirian, et al., Utility U.S. Appl. No. 15/621,553 filed Jun. 13, 2017, Office Action Summary dated Aug. 7, 2018, 11 pages.

\* cited by examiner

WAVEPLATE LENSES AND METHODS FOR THEIR FABRICATION

CROSS REFERENCES

U.S. Patent Documents

| 14,193,027 | February 2014 | Tabirian et al. |
| 61/757,259 | January 2013 | Tabirian et al. |

CLAIM OF PRIORITY

This application claims the benefit of priority to U.S. Provisional Patent Application No. 61/801,251 filed Mar. 15, 2013, the contents of which are relied upon and are incorporated herein, and this application is a Continuation-In-Part of U.S. patent application Ser. No. 13/860,934 filed Apr. 11, 2013, which is a Continuation of U.S. patent application Ser. No. 12/662,525 filed Apr. 21, 2010.

STATEMENT REGARDING FEDERALLY SPONSORED RESEARCH OR DEVELOPMENT

This invention was made with Government support under Contract No. W911QY-12-C-0016.

RIGHTS OF THE GOVERNMENT

The invention described herein may be manufactured and used by or for the Government of the United States for all governmental purposes without the payment of any royalty.

FIELD OF THE INVENTION

This invention relates to optical lenses, aspheric and apodizing components, and the method of their fabrication. The field of applications of such components includes imaging systems, astronomy, displays, polarizers, optical communication and other areas of laser and photonics technology.

BACKGROUND OF THE INVENTION

Lenses are commonly made by shaping an optical material such as glass. The weight of such lenses increases strongly with diameter making them very expensive and prohibitively heavy for applications requiring large area. Also the quality of a lens typically decreases with increasing size. Diffractive lenses such as Fresnel lenses are relatively thin, however, the structural discontinuity adds to aberrations. Uses of holographic lenses are limited by the compromise of efficiency and dispersion.

In the present invention, such components are obtained on the basis of diffractive waveplates. An exemplary structure of one of the optical components of interest is schematically shown in FIG. 1. Essentially, it is an optically anisotropic film 100 with the optical axis orientation 101 rotating in the plane of the film, the x,y plane in FIG. 1. The thickness L of the film is defined by half-wave phase retardation condition $L=\lambda/(n_{\parallel}-n_{\perp})$, where $n_{\parallel}$ and $n_{\perp}$ are the principal values of the refractive indices of the material; and $\lambda$ is the radiation wavelength. The required half-wave phase retaradation condition can be met for as low as a few micrometer thick films, particularly, for liquid crystalline materials. Such a structure imposes a phase shift $\Phi=\pm 2\alpha(x,y)$ on circular polarized beams propagating through it with the sign depending on the handedness of polarization. In simplest realization, the rotation angle $\alpha$ of the optical axis orientation is a linear function of a single coordinate, $\alpha=2\pi x/\Lambda$ with $\Lambda$ characterizing the period of the pattern. With account of $\alpha=2\pi x/\Lambda=qx$, where $q=2\pi/\Lambda$, an unpolarized beam is thus diffracted by the diffractive waveplate into +/−1st diffraction orders with the magnitude of the diffraction angle equal to $\lambda/\Lambda$. The phase $\Phi$ in the equation above, known as geometrical or Pancharatnam phase, does not depend on wavelength, hence the broadband nature of the diffraction. Due to its half-wave plate nature, there are well developed techniques for making the component essentially achromatic in a wide range of wavelengths. In case of quadratic variation pattern of the optical axis orientation, $\alpha \sim x^2$ or, in two dimensional case, $\alpha \sim x^2+y^2$, the parabolic phase modulation profile produces cylindrical or spherical lens action, correspondingly.

Thus, there is a need and an opportunity provided by the current invention for fabricating lenses and other nonlinear phase modulating components that could be obtained in the form of thin film structurally continuous coatings on a variety of substrates.

BRIEF SUMMARY OF THE INVENTION

The objective of the present invention is providing structurally continuous thin film lenses, positive or negative.

The second objective of the present invention is providing a polarizing lens.

The third objective of the present invention is providing a lens with polarization dependent power sign.

The fourth objective of the present invention is providing a lens wherein the power can be varied (increased) without varying (increasing) thickness.

The fifth objective of the present invention is providing means for fabricating aspherical optical components in the form of thin film coatings.

The sixth objective of the present invention is providing thin film variable lens.

The seventh objective of the present invention is providing micro lenses and their arrays as thin film coatings.

The eight objective of the present invention is providing broadband/achromatic thin film lenses for different spectral range.

The ninth objective of the present invention is providing a method for fabricating and replicating waveplate lenses.

Still another objective of the present invention is providing electrically controlled waveplate lenses.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not limitation.

Figure 1:
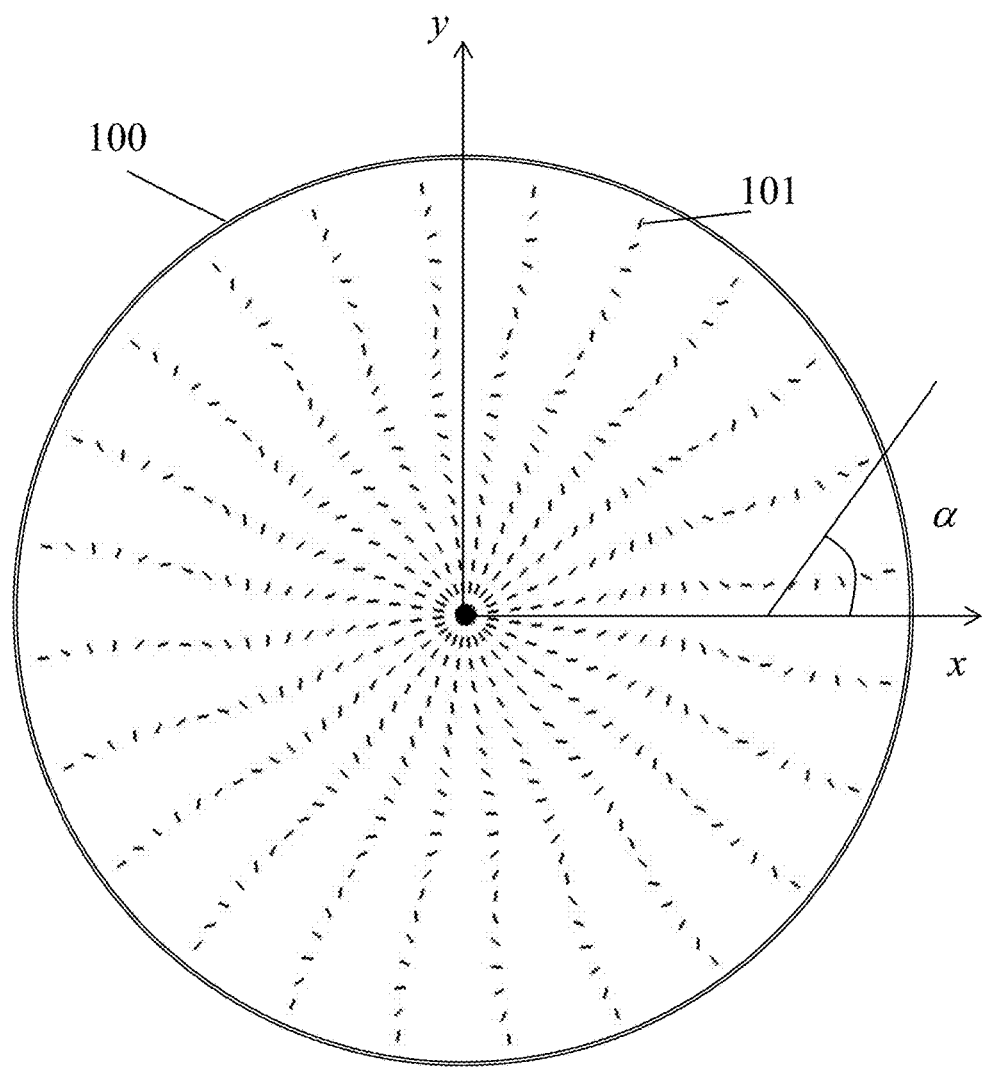
FIG. 1A shows spatial distribution of optical axis orientation in a vortex waveplate lens.
FIG. 1B shows spatial distribution of optical axis orientation in a spherical waveplate lens.
FIG. 1C shows spatial distribution of optical axis orientation in a cylindrical waveplate lens.
Figure 1B:
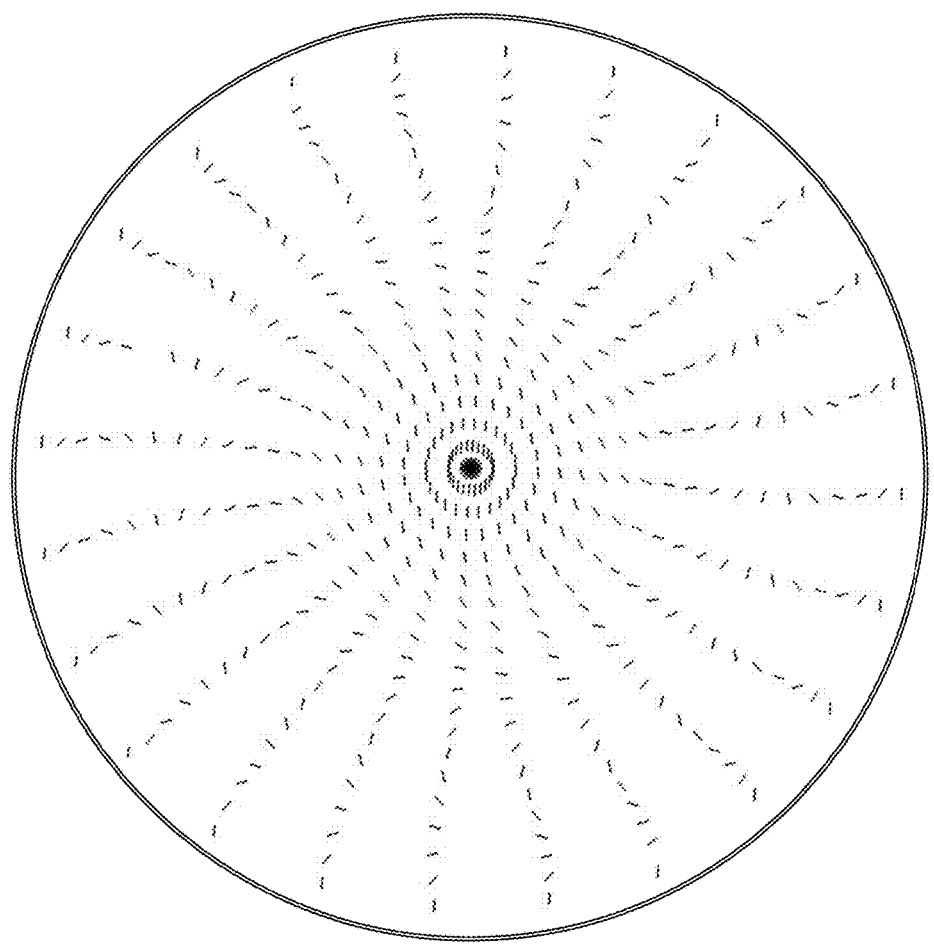
Figure 1C:
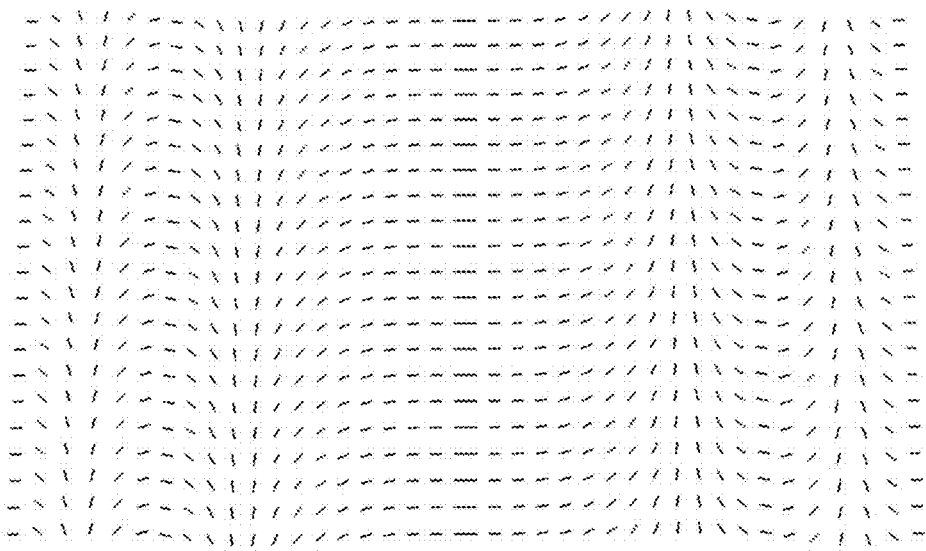
Figure 2:
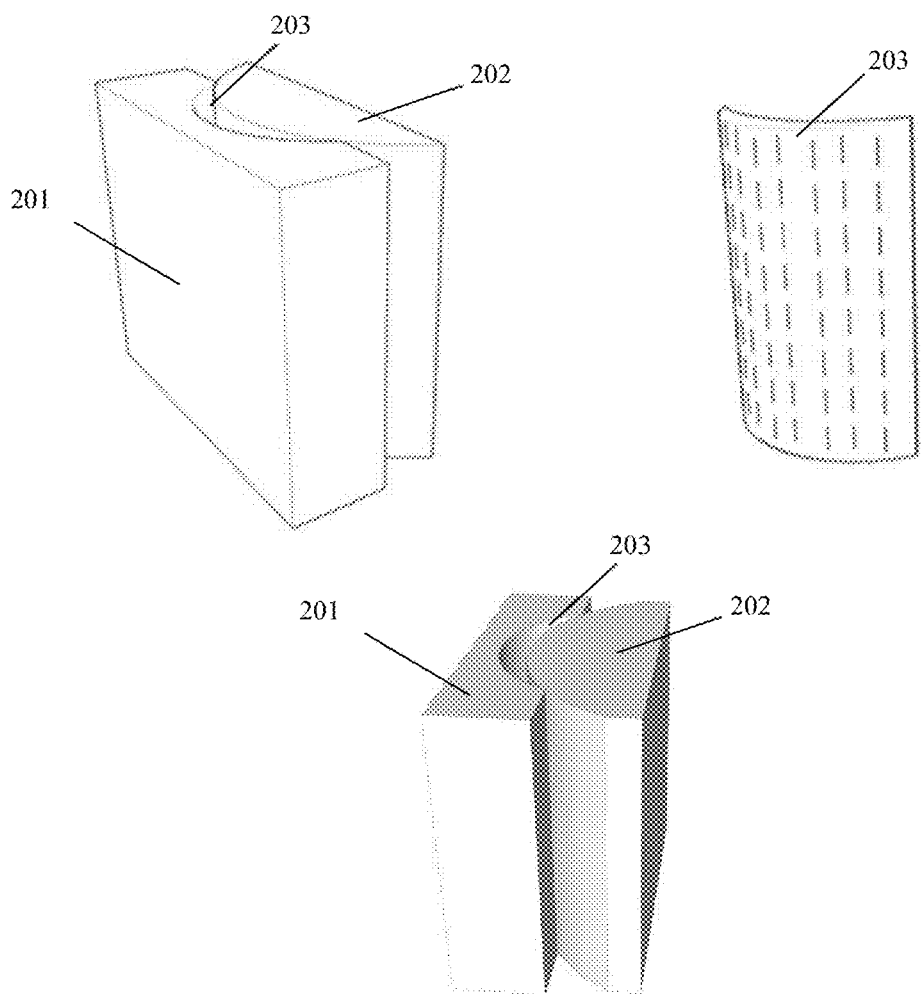
FIG. 2 schematically shows a shape-variant polarization converter comprising a concave and a convex lens sandwiching a planar aligned nematic liquid crystal in-between. A cylindrical system is shown for drawing simplicity.

Patterns of optical axis orientation demonstrating examples of waveplate lenses of current invention are shown in FIG. 1. An example of a key component of spatially nonlinear polarization converting system of the present invention shown in FIG. 2 comprises a cylindrical plano-convex lens 202 and a cylindrical plano-concave lens 201 sandwiching a planar aligned nematic liquid crystal (NLC) layer 203. Cylindrical or spherical lenses are used for fabricating cylindrical or spherical waveplate lenses, correspondingly. The focal length of plano-convex and plano-concave lenses can be chosen to create a cell gap between the lenses with depth as small as 1 μm or as large as 1 mm. For example, a lense of focal length F1=150 mm with curvature radii ?? can be combined with a lens of focal length F2=−100 mm with curvature radii ?? for obtaining a gap of 340 μm.

To align the NLC layer within the lenses, the surfaces of the lenses that are in touch with the NLC can be spin-coated with 0.5 wt. % solution of PVA in distilled water at 3000 rpm for 30 s. Then, they can be dried during 20 min at 100° C. and rubbed with a soft cloth in one direction. NLC E48 (Merck) can be used to fill in the cells, as an example.

Figure 3A:
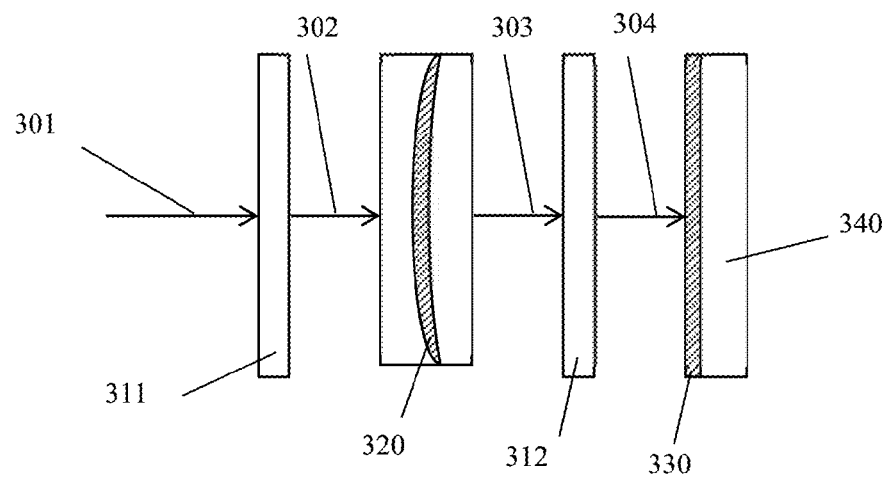
FIG. 3A schematically shows an optical system for recording nonlinear variation patterns for liquid crystal orientation on a substrate coated with a photoaligning material film.
Figure 3B:
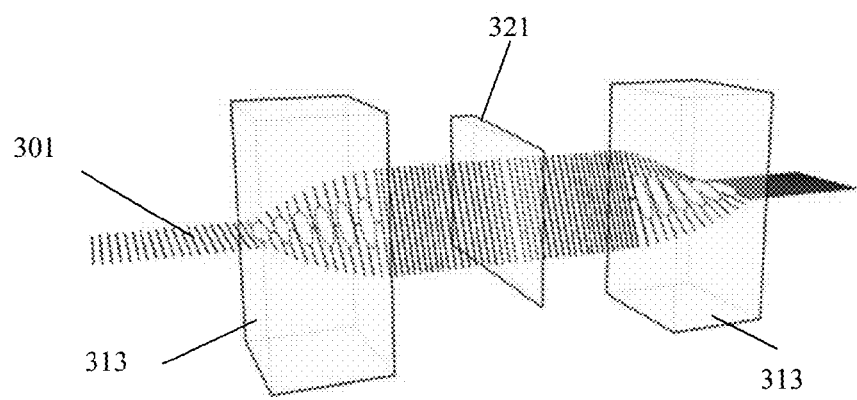
FIG. 3B schematically shows an optical system with a biriefringent wedge acting as spatial light polarization modulator, and twist oriented liquid crystal cells as polarization converter components.

This shape-variant birefringent film 203 provides spatially varying phase retardation acting as a spatial light polarization modulator (SLPM). The polarization control system may further incorporate additional polarizing optics that ensures equality of the electric field strength of ordinary and extraordinary wave components generated in the SLPM film. For example, when using a linear polarized laser beam 301 in FIG. 3A, a quarter-waveplate 311 can be used for creating a circular polarized light beam incident on the SLPM film 320 as shown in FIG. 3A. Alternatively, a twisted liquid crystal polarization rotator 313 can be used to rotate the polarization of the incident light beam 301 to arrange it at 45 degrees with respect to the anisotropy axis of the SLPM film 320 as show in FIG. 3B. The spatial modulation of polarization obtained at the output of the film is further transformed by a second quarter-waveplate 312 in the schematic shown in FIG. 3A or a twisted nematic film 313 in the example shown in FIG. 3B. Thus, cyclodal distribution of light polarization can be obtained in a particular case of a SLPM film in the form of a birefringent wedge 321 in FIG. 3B. The twist angle, when using NLC cells for controlling the beam polarization at the input and output of the SLPM film may be 45 degrees as depicted schematically in FIG. 3B. The mutual alignment of the axes of the quarter-waveplates in FIG. 3A or the twist NLC cells in FIG. 3B shall be such as the transmitted beam is linear polarized at the absence of the SLPM film.

An expanded beam of an Argon ion laser operating at 488 nm wavelength providing a power density 12 mW/cm$^2$ can be used for photoalignment of the photoaligning layer 330 deposited on a support substrate 340. The beam propagates through two quarter waveplates and the SLPM film 320 between them in FIG. 3A. In the example shown in FIG. 3B, the beam propagates through the system of two polarization rotators and the SLPM film 321 between them.

Figure 4:
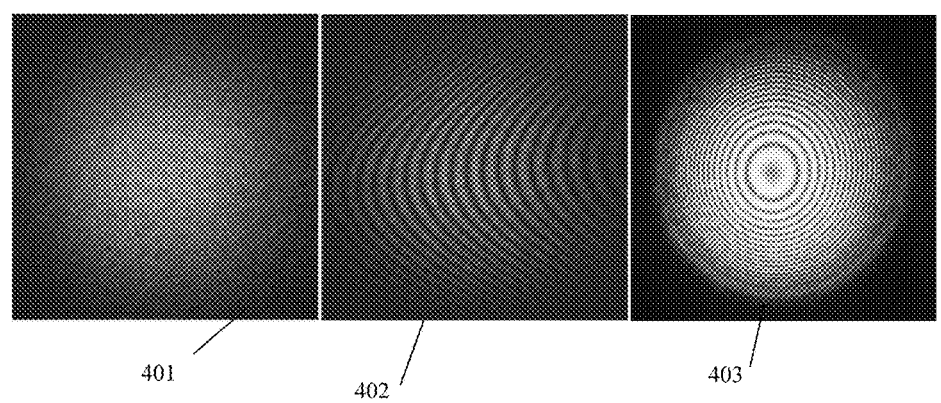
FIG. 4 shows photos of a laser beam received at the output of the optical recording system observed with and without a polarizer for both a cylindrical and a spherical birefringent lens.

The pattern of polarization distribution of the beam at the output of the system can be verified with a linear polarizer on a screen. Cylindrical and spherical cycloidal distribution of polarization is shown in FIG. 4. The item 401 in FIG. 4 corresponds to the pattern observed without polarizers. It shows homogeneous distribution of light intensity since the only parameter being modulated is polarization. In contrast, polarization modulation is revealed between polarizers as parabolic fringes in case of cylindrical lens 402 and concentric modulation pattern in case of a spherical lens 403.

The polarization modulation patterns can be recorded, as an example, on PAAD series photoalignment material layers (available at beamco.com). The PAAD layer is created on a substrate, glass, for example, by spin-coating a solution of PAAD-72(1%)/DMF at 3000 rpm during 30 s. PAAD layer can be pre-exposed with linear polarized LED light, 459 nm wavelength, for example, before recording the lens; the pre-exposure time is approximately 10 min at power density 10 mW/cm$^2$. The pre-aligned PAAD layer is exposed then to the Argon ion laser beam during 60 s.

Having thus created the required alignment conditions, the PAAD coated substrate can be coated with layers of liquid crystal monomer solution, for example, RMS-03-001C (Merck, Ltd.), followed by photopolymerization with unpolarized UV light at 365 nm wavelength during 5 min. The first layer of the RMS-03-001C can be spin-coated on PAAD-72 layer at a speed 3000 rpm during 1 min. A second layer of RMS-03-001C can be spin-coated on the first layer at a 2000 rpm during 1 min followed by photopolymerization as indicated above to create half-wave phase retardation condition at, for example, 633 nm wavelength.

Alternatively, photoaligned substrates can be used for making electrically or optically controlled liquid crystal cells resulting in electrically or optically controlled waveplate lenses. Details?

Figure 5:
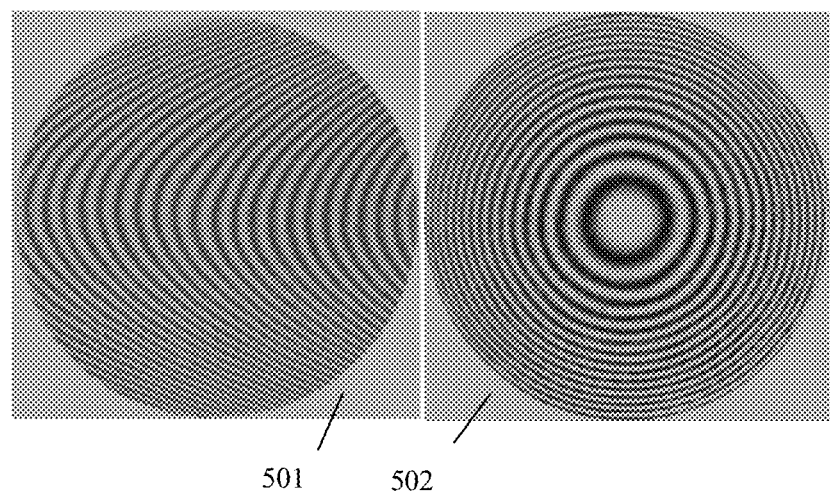
FIG. 5 shows photos of liquid crystal polymer films photoaligned with a cylindrical and spherical lens. Photos are obtained between crossed polarizers.
Figure 6A:
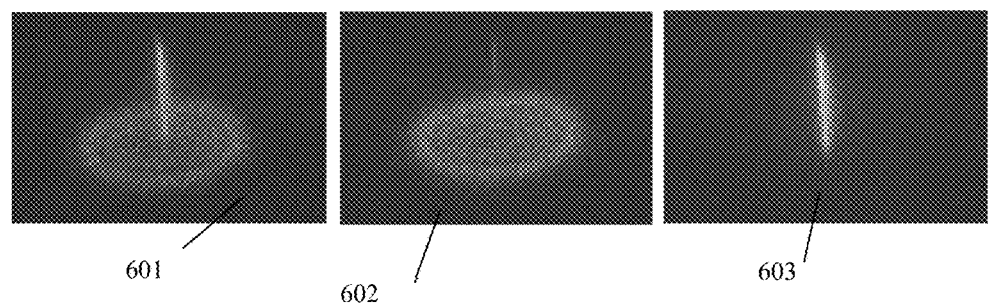
FIG. 6A shows photos of a laser beam focused with a cylindrical waveplate-lens for different polarization states: linear, right-hand circular, and left-hand circular.
Figure 6B:
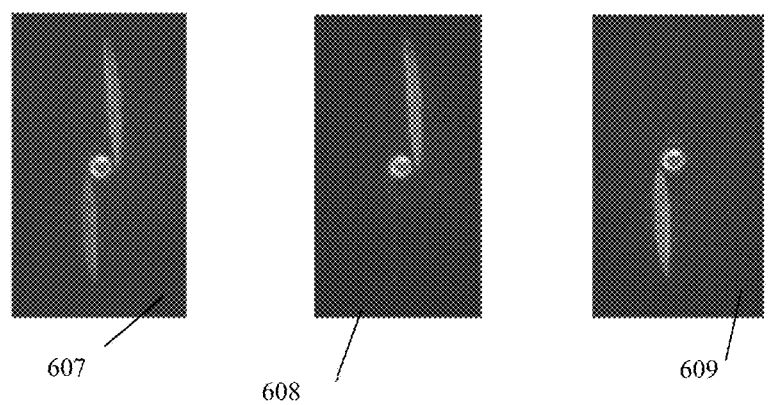
FIG. 6B shows far field photos of a laser beam focused with a cylindrical waveplate-lens for different polarization states: linear, right-hand circular, and left-hand circular.
Figure 6C:
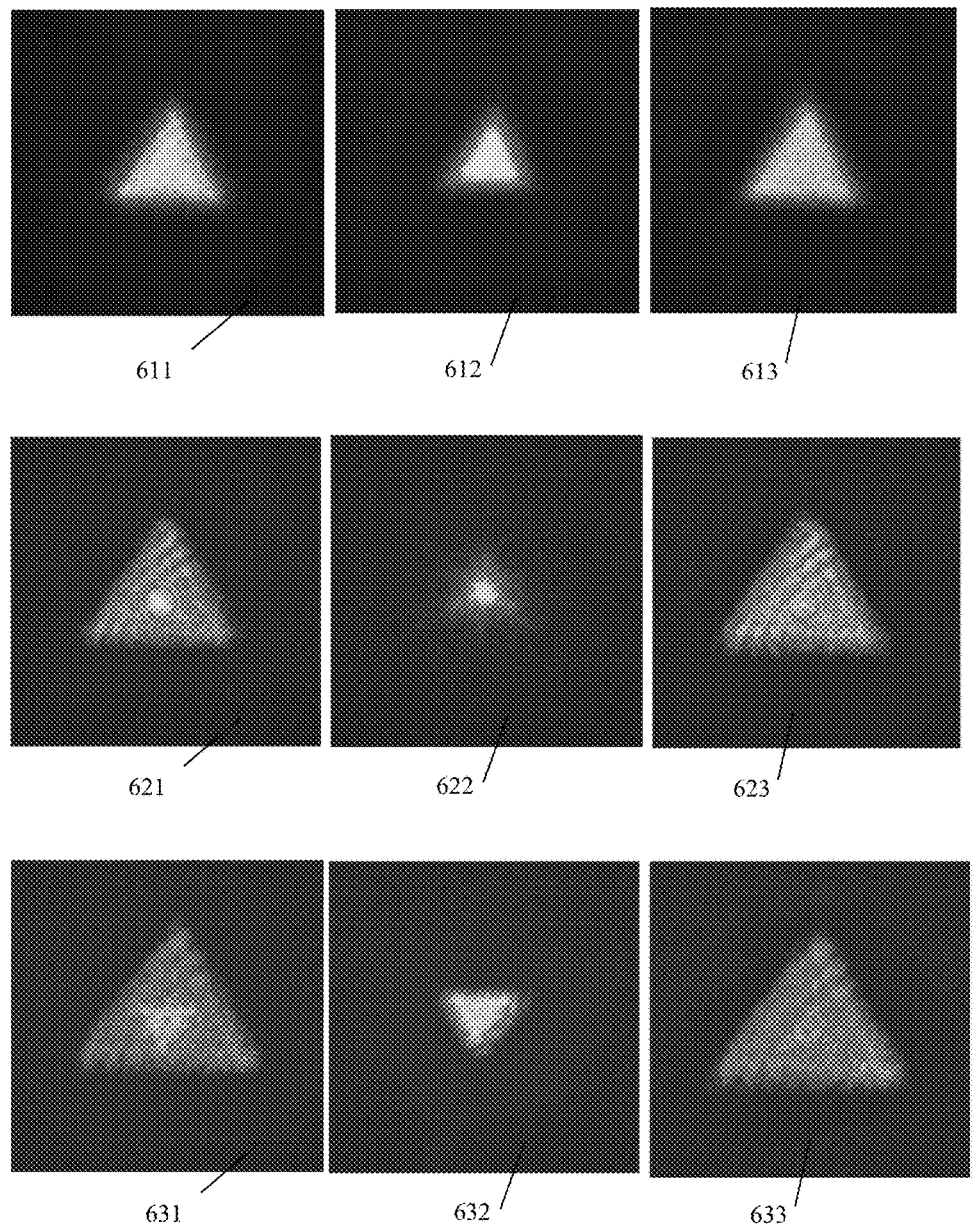
FIG. 6C shows photos of projections of a triangular aperture with a spherical waveplate-lens for different polarization states: linear, right-hand circular, and left-hand circular. Photos are obtained at planes before, at, and far from the focus of the lens.
Figure 6D:
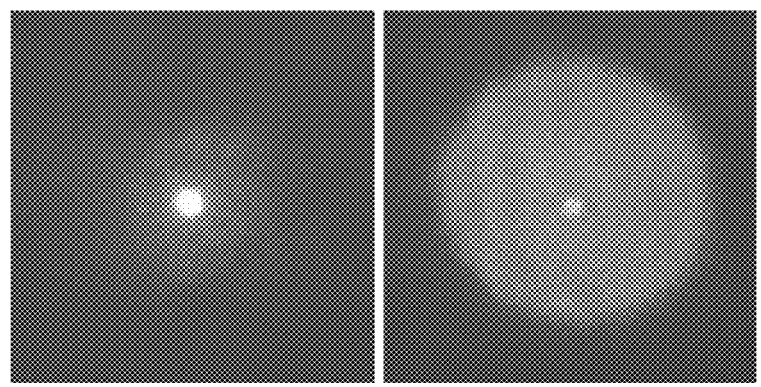
FIG. 6D shows switching the focusing state to defocusing state by switching the handedness of a circular polarized beam.

Cylindrical and spherical LC polymer lens structures are shown in FIG. 5, items 501 and 502, correspondingly, between crossed polarizers. Focusing and defocusing patterns of a red laser beam on above structures are shown in FIG. 6 at different conditions. The Focal length of the cylindrical waveplate-lenses used in FIG. 6 is 84 cm and 7 cm: photos 601-603 (F=84 cm) are obtained in its focal plane. Photos 607-609 (F=7 cm) correspond to far field zone. Photos 601, and 607 correspond to linear polarized incident light. Photos 602, and 608 correspond to left-hand circular polarized incident beam. The photos 603, and 609 correspond to right-hand circular polarized incident beam.

Projection of a mask with a triangular opening with the aid of a spherical cycloidal lens is shown in FIG. 6. Photos 611, 612, and 613 were taken behind the lens before focus. Photos 621, 622, and 623 were taken at the focus of the lens (F=190 mm), and the Photos 631, 632, and 633 were taken far from the focus. The photos 611, 621 and 631 correspond to linear polarized or unpolarized incident beam. The photos 612, 622 and 632 correspond to left-hand circular polarized incident beam, and the photos 613, 623, and 633 correspond to right-hand circular polarized beam, correspondingly. The focusing conditions can be controlled by using electrically or optically controlled phase retardation plates to modulate the polarization state and distribution in the input light.

Figure 7:
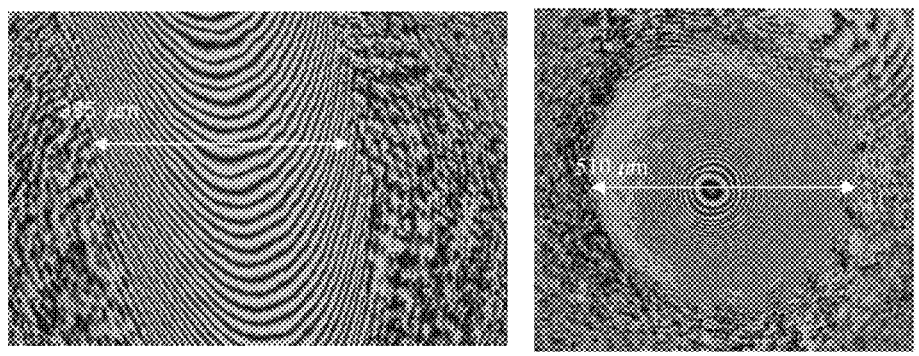
FIG. 7 shows photos of a cylindrical and spherical waveplate-microlenses.
Figure 8:
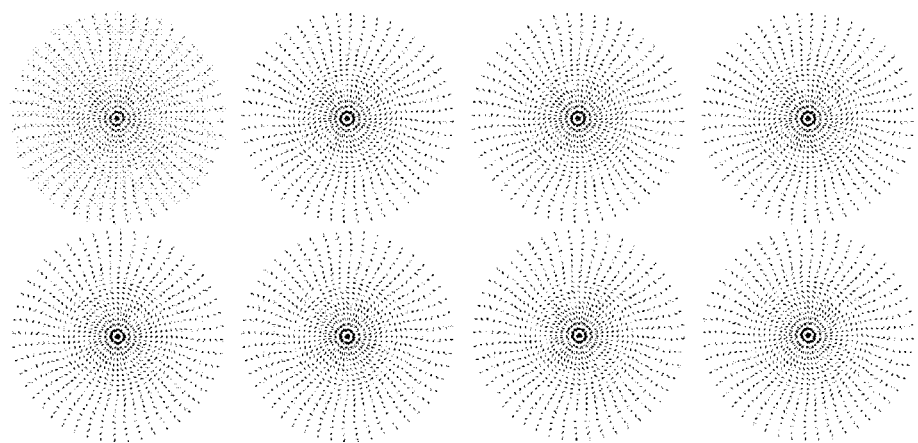
FIG. 8 schematically shows an array of spherical microlenses.

Lenses of different focal length can be recorded by simply changing the size of the polarization modulation pattern projected onto the photoalignment layer. FIG. 7 shows examples of lenses of less than a mm diameter. The projection can be simply made by a focusing lens placed after the output quarter-wave plate. Lens size of 0.6 mm, for example, corresponded to a focal length of 3 mm while a lens size of 6 mm exhibited a focal length of 475 mm. Arrays of such microlenses can be printed as schematically shown in FIG. 8.

Although the present invention has been described above by way of a preferred embodiment, this embodiment can be modified at will, within the scope of the appended claims, without departing from the spirit and nature of the subject invention.

What is claimed is:

1. A method for fabricating diffractive waveplate lens of nonlinear phase modulation profile comprising:
    (a) providing a substrate;
    (b) dispensing a photoaligning material layer over said substrate;
    (c) providing a light source with wavelength in the absorption band of said photoalignment material;
    (d) propagating a light beam from the light source through polarization control optics comprising a polarization converter outputting a spatially nonlinear distribution of linear polarization along a radial direction;
    (e) further propagating said light beam from the light source through an optical projection system;
    (f) exposing said photoaligning material layer to said light beam at the output of said optical projection system,
    (g) dispensing a polymerizable liquid crystal precursor over the photoaligned material layer; and
    (h) in-situ reacting said polymerizable liquid crystal to form a polymer film.

2. The method for fabricating diffractive waveplate lens as in claim 1 further comprising deposition of two or more liquid crystal polymer films which vary in thickness, optical anisotropy and chirality.

3. The method as in claim 1 wherein said spatially nonlinear polarization converter comprises an assembly of a first substrate and a second substrate with at least one of the first and the second substrate having non-planar surface topology, said first substrate and said second substrate treated for inducing alignment of liquid crystalline materials, and a liquid crystalline material being sandwiched in-between the first substrate and the second substrate.

4. The method as in claim 3 wherein said first and second substrates are plano-convex and plano-concave lenses.

5. The method as in claim 1 wherein said polarization control optics further comprises an input and an output quarter waveplates with their axes aligned parallel or perpendicular to each other.

6. The method as in claim 1 wherein said polarization control optics further comprises an input and an output liquid crystal cells, each possessing a twist, oriented such as the resultant polarization is linear at the absence of the nonlinear polarization converter.

7. The method as in claim 1 wherein said nonlinear polarization converter comprises a diffractive waveplate-lens meeting half-wave phase retardation condition for the wavelength of the recording radiation.

8. The method as in claim 1 wherein said nonlinear polarization converter comprises material with spatially varying optical anisotropy in the radial direction.

* * * * *